Oct. 19, 1965 J. A. GUIFFRE 3,212,335
BEER KEG MEASURING DEVICE
Filed Feb. 2, 1962
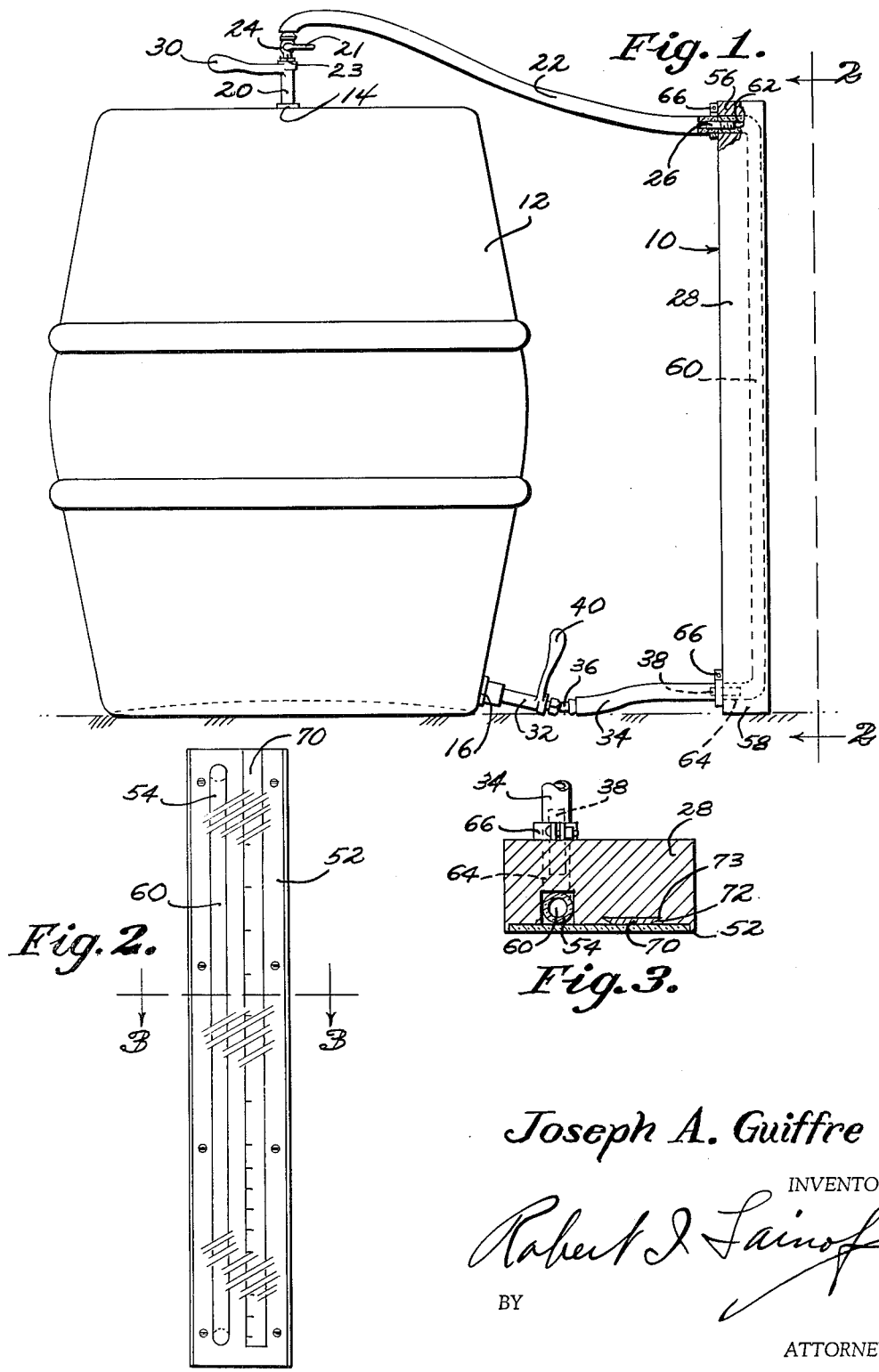
Joseph A. Guiffre
INVENTOR
BY
ATTORNEY

United States Patent Office 3,212,335
Patented Oct. 19, 1965

3,212,335
BEER KEG MEASURING DEVICE
Joseph A. Guiffre, 1001 Beechwood Lane,
Falls Church, Va.
Filed Feb. 2, 1962, Ser. No. 170,547
2 Claims. (Cl. 73—328)

This invention relates to a beer keg measuring device and is intended to provide a simple and more efficient means of determining the amount of beer or ale remaining in beer kegs used today.

In the industry wherein the device of my invention is to be utilized, tap beer is sold to taverns and bars in metal kegs which are loaded in the brewery under pressure. Due to the pressure constantly maintained within a filled or partially filled keg of beer no practical device has as yet been found in the industry which will permit the operator of the business, wherein the beer is sold "at tap," to determine the amount of beer sold at any interval of time, or the amount of beer which he has left in an opened or used keg. Because of his inability to determine this needed information, the shop keeper is often times inconvenienced at a rather busy hour to change from a keg which has just been emptied to another fresh keg.

Moreover, in not being able to accurately determine the amount of beer sold within a certain period of time, as for example, from the open of a business day to its close, the owner of such business is unable to determine if he is getting all the receipts which should be forthcoming from each keg of beer or ale.

An object of my invention is to provide a pressure keg measuring device which can be quickly connected to measure the amount of beer remaining in a used keg of beer or ale yet under pressure.

A further object of my invention is to provide a pressure keg measuring device which can be quickly connected to measure the remaining beer in a keg under pressure, while the keg of beer is in its usual position under the dispensing fountain in a tavern or bar.

Another and further object of my invention is to provide a beer measuring device for pressure beer kegs which is simple in construction, economical to manufacture, and which will provide the user with a device which can easily and quickly be connected to a keg for measurement of the quantity of beer or ale remaining therein.

Other and further objects and features of my invention will become more apparent from the following detailed description and appended claims, in which:

FIGURE 1 is a side elevational view of the measuring device of my invention connected to a beer keg having its contents under pressure;

FIGURE 2 is a front elevational view of the measuring device of my invention taken on the line 2—2 of FIGURE 1;

FIGURE 3 is a sectional view of the measuring device of my invention taken on line 3—3 of FIGURE 2 looking downward in the direction indicated.

Referring to the drawings, wherein similar characters of references are employed in the above described views to indicate corresponding parts, the numeral 10 indicates the measuring device of my invention.

As seen in FIGURE 1, the measuring device 10 is shown connected to a metal beer keg 12. As is standard in the manufacture of this type beer keg, a top valve connection 14 is provided in the center of the top face of the beer keg, and a bottom valve connection 16 is provided on the lower edge of the outer side face of the keg.

When the keg of beer is connected to a fountain faucet for dispensing beer, the top valve connection is connected to the $CO_2$ gas tank (or to a compressed air tank) and the bottom valve connection is connected to the fountain tap or dispensing faucet. As is commonly known in the business, the keg is generally positioned in a refrigerated storage cabinet positioned below a fountain faucet (not shown) in a location out of the way of foot movement by the operator behind a dispensing bar.

When it is desired to measure the quantity of beer remaining in the keg, the operator of the establishment wherein the keg of beer is installed, will disengage the lines leading from the top valve connection and the bottom valve connection and will connect the device of my invention to the keg in the manner hereinafter described.

The measuring device 10 of my invention is provided with a valve key 20 which is inserted into a top valve connection 14 of the keg. When valve key 20 is inserted and seated within the valve connection 14, an open line is immediately created which is then controlled only by the control valve 21. The control valve 21 is connected to the control valve 21 at 24 and extends to, and is connected to, a connecting nipple 26 provided at the top of the back portion of the measuring gage housing 28 of my device. An applicating handle 30 is provided on the valve key 20 to aid the user thereof in inserting the key into the valve connection 14 located in the top face of the keg 12.

The measuring device 10 of my invention is further provided with a second valve key 32 which is inserted into the bottom valve connection 16 of the keg. A flexible tubing or line 34 is connected to the valve key 32 at 36 and extends to and is connected to a connecting niple 38 provided at the bottom of the back portion of the measuring gage housing 28. An applicating handle 40 is provided on the valve key 32 to aid the user in inserting the valve key into the valve connection 16.

The measuring gage 28 of my measuring device is provided with a rectangular and upright housing. On the front face 52 of the gage housing 28, a recessed slot 54 is formed to extend almost throughout its length from immediately adjacent the top 56 to a point immediately adjacent the bottom 58 thereof, as seen in FIGURE 2.

As shown in FIGURES 1 and 3 a cylindrical tube 60, formed of plastic or other clear or transparent material is mounted within the slot. At its upper extremity the slot 54 connects with a bore 62 which extends from the slot to the back face of the gage housing. At its lower extremity the slot 54 connects with a bore 64 which extends from the slot to the back face of the gage housing.

As appears obvious in FIGURE 1, the tube 60 terminates in a right angular turned portion in both its top and bottom ends. The top portion of tube 60 extends through the bore 62 and terminates flush with the rear face of the gage housing 50. The bottom portion of the tube 60 extends through the bore 64 and also terminates flush with the rear face of the gage housing 50.

A connecting nipple 26 is connected to and extends from the upper end of the tube 60 outwardly from the rear face of the gage housing. A connecting nipple 38 is connected to and extends from the lower end of the tube 60 outwardly from the rear face of the gage housing. As is shown in FIGURES 1 and 3, a clamp 66 is provided to fixedly connect the tubing 22 on the nipple 26 and to fixedly connect the tubing 34 on the nipple 38.

The front face 52 of the gage housing is additionally provided with a calibrated measuring indicator 70 mounted within a recess 72 formed in the gage housing. The recess 72 in the gage housing 28 is provided in the housing from a point level with the bottom of the bore 64 and is extended upwardly throughout the entire height of the housing. As seen in FIGURE 3 the recess 72 has a larger inner width formed with its sides bevelled at 73 toward the narrower front face 52. Obviously, the indicator provided is bevelled in a complementary manner so that the front face of the indicator is narrower than its rear portion to thus securely hold the indicator within the confines of the recess while in use.

In the operation of my device, the operator will disconnect the usual connections from his faucet and air tank at the valves 14 and 16 of the beer keg. Then by pressure applied on the applicating handles, the operator inserts the valve key 20 within the valve connection 14 of the beer keg 12. The operator will then insert the valve key 32 into the valve connection 16 at the bottom of the beer keg 12. After both keys 20 and 32 have been properly seated within the beer keg valve connections, the operator will turn the control valve 21 to thus open the entire circuit formed by the tubing, the valve connections and the keg.

Obviously, when valve key 20 is inserted and properly seated within the valve connection, the control valve 21 will prevent the beer, under pressure in the keg, from being forced through the tubing. However, when the valve key 32 is inserted in the valve connection 16 and properly seated a direct open connection is made and the pressure in the keg will force the beer up through the tubing in the gage housing 28. However, since there is no additional pressure being applied at the top valve, connection (by $CO_2$ or other compressed air) the beer will not rise to extend through the upper tube 22. Thus, after both connections have been made through valve connection 14 and valve connection 16, the operator by opening the control valve 21 will then cause an equalization of pressure in both the beer keg and the gage.

Thus due to the equalization of pressure that will occur when the control valve 21 is moved into the open position, the height of the beer or ale remaining in the keg will then be reflected in a similar height within the tube in the gage housing.

It is thus believed obvious, that with the bottom of the gage positioned on a level with the bottom of the keg the operator may easily read the height of the liquid within the gage to determine the amount of beer remaining within the keg.

As is believed further obvious, the gage may be transposed to give a reading based on gallons or glasses of beer of fixed quantities or other desired constant quantities rather than height in feet or inches. It being but a simple mathematical determination to define inches in height into a number of glasses of a fixed quantity of beer remaining within the keg. Thus a different gage may be substituted within the recess 72 dependent upon the desired reading required by the tavern or bar operator.

Numerous modifications and variations of the present invention will occur to those skilled in the art after a careful study of the invention which I have here disclosed. All such modifications and variations which come within the spirit and scope of the present invention are intended to be included herein as fully and completely as if they had been specifically illustrated, described and claimed herein.

The exact construction and relative positioning of the various component parts of this invention is by way of example and may be modified substantially within the scope and spirit of my invention.

What I claim as new is:

1. In a beer level indicator for use with pressure beer kegs or the like, a gage housing, a slot provided in said housing and extending from a point adjacent the bottom thereof to a point adjacent the top thereof, a bore extending from the top of said slot through said housing and at a right angle to said slot, a second bore extending from the bottom of said slot through said housing and at a right angle to said slot, a transparent tube having a right-angular turned end portion positioned within said slot and said bores, a first valve key and a second valve key, a tube connecting the transparent tube adjacent the top of the housing to said first valve key and a transparent tube connecting the tube adjacent the bottom of the housing to said second valve key, said first valve key being connected to said beer keg at the top thereof and said second valve key being connected to said beer keg at the bottom thereof, said housing being formed with an opened recess adjacent the slot and a measuring indicator removably provided within said recess.

2. In a beer level indicator for use with pressure beer kegs or the like, a gauge housing, a slot provided in said housing and extending from a point adjacent the bottom thereof to a point adjacent the top thereof, a bore extending from the top of said slot through said housing and at a right angle to said slot, a second bore extending from the bottom of said slot through said housing and at a right angle to said slot, a transparent tube having a right angular turned end portion positioned within said slot and said bores, a first valve key and a second valve key, a tube connecting the transparent tube adjacent the top of the housing to said first valve key and a tube connecting the transparent tube adjacent the bottom of the housing to said second valve key, said first valve key being connected to said beer keg at the top thereof and said second valve key being connected to said beer keg at the bottom thereof, an applicating handle connected to and forming a part of each valve key and a control valve connected to one of said valve keys.

References Cited by the Examiner

UNITED STATES PATENTS

| 1,078,325 | 11/13 | Vickrey | 73—323 |
|---|---|---|---|
| 1,268,292 | 6/18 | Stancliffe | 73—401 X |
| 1,364,503 | 1/21 | King | 73—299 |
| 1,680,174 | 8/28 | Rhodes et al. | 73—333 |
| 2,847,856 | 8/58 | Mahon | 73—325 |

FOREIGN PATENTS

| 9,570 | 1886 | Great Britain. |
|---|---|---|
| 21,486 | 10/03 | Great Britain. |
| 5,472 | 1907 | Great Britain. |
| 348,136 | 3/37 | Italy. |

ISAAC LISANN, *Primary Examiner.*